No. 704,256. Patented July 8, 1902.
J. G. HODGSON & J. C. TALIAFERRO.
AUTOMATIC SIDE SEAM SOLDERING MACHINE FOR SHEET METAL CANS.
(Application filed Nov. 24, 1900.)
(No Model.) 6 Sheets—Sheet 1.

No. 704,256. Patented July 8, 1902.
J. G. HODGSON & J. C. TALIAFERRO.
AUTOMATIC SIDE SEAM SOLDERING MACHINE FOR SHEET METAL CANS.
(Application filed Nov. 24, 1900.)
(No Model.) 6 Sheets—Sheet 4.

United States Patent Office.

JOHN G. HODGSON, OF MAYWOOD, ILLINOIS, AND JOHN C. TALIAFERRO, OF BALTIMORE, MARYLAND, ASSIGNORS, BY MESNE ASSIGNMENTS, TO AMERICAN CAN COMPANY, OF JERSEY CITY, NEW JERSEY, A CORPORATION OF NEW JERSEY.

AUTOMATIC SIDE-SEAM-SOLDERING MACHINE FOR SHEET-METAL CANS.

SPECIFICATION forming part of Letters Patent No. 704,256, dated July 8, 1902.

Application filed November 24, 1900. Serial No. 37,598. (No model.)

*To all whom it may concern:*

Be it known that we, JOHN G. HODGSON, residing in Maywood, in the county of Cook and State of Illinois, and JOHN C. TALIAFERRO, residing in Baltimore, in the State of Maryland, citizens of the United States, have invented a new and useful Improvement in Automatic Side-Seam-Soldering Machines for Sheet-Metal Cans, of which the following is a specification.

This invention relates to machines for soldering the side seams of sheet-metal cans. Its object is to provide an automatic machine of a simple, efficient, and durable construction by means of which the side seams of sheet-metal cans may be automatically, perfectly, rapidly, and cheaply soldered with certainty and reliability and so that the cans may be safely relied upon not to develop leaks at the seams and by means of which the soldering may be done economically of fuel and solder and without any unnecessary smearing of the surface of the can-body with solder.

The invention consists in the means devised for practically accomplishing this important result, and the automatic machine embodying it comprises, in combination, a solder bath or vessel for holding molten solder; a float guide or track for the can-bodies which floating in the molten solder automatically adjusts itself to the changing level or depth of solder in the vessel, and thus causes the can-body seam to be always properly and uniformly immersed in or exposed to the solder; a guide or track for the can-bodies leading to and from the floating can-body track-guide; a can-body carrier or conveyer for moving the can-bodies along the can-body tracks or guides; a seam-turning device supported in the path of the can-bodies and around which the can-bodies pass, the seam-turning device having curved, inclined, or cam-shaped shoulders to engage the side seam of the can-body and turn or adjust the can-body so that its side seam is in its lowermost position before entering the solder-bath; a series of inside wipers connected to a wiper-bar which is supported in the path of the can-bodies and around which the can-bodies pass; a long trunk-rod having a curved end extending partially around the rear sprocket-wheel of the can-body conveyer-chain, so as to be held in position longitudinally thereby, and to which the inside wiper-bar and the seam-turner around which the can-bodies pass are attached and by which they are held in position; a series of outside wipers and wiper-brushes mounted upon an endless traveling belt; a device for cleaning the wiper-brushes, and devices for automatically delivering the can-bodies to and from the can-body carrier.

The invention also consists in the novel construction of parts and devices and in the novel combinations of parts and devices herein shown and described, and specified in the claims.

In the accompanying drawings, forming a part of this specification, Fig. 5 is a detail top view, and Fig. 6 a detail bottom view, of the seam-turner. Fig. 7 is a cross-section on line 7 7 of Fig. 1; Fig. 8, a detail central vertical longitudinal section of the parts shown in Fig. 7, and Fig. 9 a detail plan thereof. Fig. 20 is a cross-section on line 20 20 of Fig. 1. The numerals 3 4 5 6 7 8 9 10 11 12 13 14 15 16 17 18 19 20 21, which appear at the top of Fig. 1 of the drawings, indicate the general location in the machine of the parts or devices which are shown in the correspondingly-numbered figures of the drawings.

In the drawings similar letters of reference indicate like parts throughout the several figures.

In the drawings, A represents the frame of the machine.

B is the can-body carrier or conveyer, the same consisting, preferably, of an open-link chain composed of side bars $b\ b\ b'\ b'$, pivotally connected together by cross-bars $b^2$, the cross-bars engaging the ends of the can-bodies and pushing the same along the can-body tracks or guides, the cross-bars being far enough apart to admit the can-bodies between them. The can-body conveyer-chain B is mounted upon and actuated by the sprocket-wheels $B'\ B^2$, the shafts of which are journaled on the frame of the machine.

C is the solder bath or vessel, containing molten solder.

D is the floating track or guide for the can-bodies. It is mounted on a float $D'$, so that its relative position in respect to the surface of the molten solder will remain the same whatever may be the height, depth, or level of the molten solder in the solder vessel C, which is subject to variation as the solder is used up and also from time to time when additional solder is put into the vessel. This insures that every can is exposed exactly alike to the action of the solder-bath and renders it possible to expose only the exact required minimum arc of the can-body to the action of the solder and to solder the seams with the least possible amount of solder and at the same time with certainty and reliability in respect to each and every can. The float $D'$ is made of metal, so as to withstand the heat of the molten solder, and the same is furnished with downwardly-projecting flanges $d$ and hollow pipes or chambers $d'$ to give the required buoyancy. The float has a longitudinal channel $d^2$ to permit the molten solder to come in contact with the seam $x$ of the can-body X. The float $D'$ is further provided with upwardly-projecting arms $d^3$, upon which the upper guide $D^2$ for the can-bodies is mounted. The can-bodies pass under this upper guide and by it are held firmly against the lower guides D D. The three guides serve to round the flexible sheet-metal can-body or bring it to an approximately true cylindrical shape while being presented to the molten solder. This upper guide $D^2$ being mounted upon the float its pressure on the can-body does not, of course, tend to vary the height of the float or of the can-body guides D D thereon in respect to the level of the solder. The upper guide $D^2$ may be adjusted up and down by the set-screws $d^4$. The guides $d^5$ keep the float in position laterally and longitudinally in the solder-bath, while permitting it to rise or fall or move up or down with the change of depth of the solder in the solder vessel. To accurately adjust the height of the float in respect to the surface of the solder, weights $d^6$ may be hung or placed upon the float.

E is the track or guide for the can-body carrier B, mounted on the stationary frame of the machine and extending between the sprocket-wheels $B'\ B^2$. The chain-guide E extends over the float without touching it, so that the weight of the moving chain B cannot influence the float.

Figure 1:
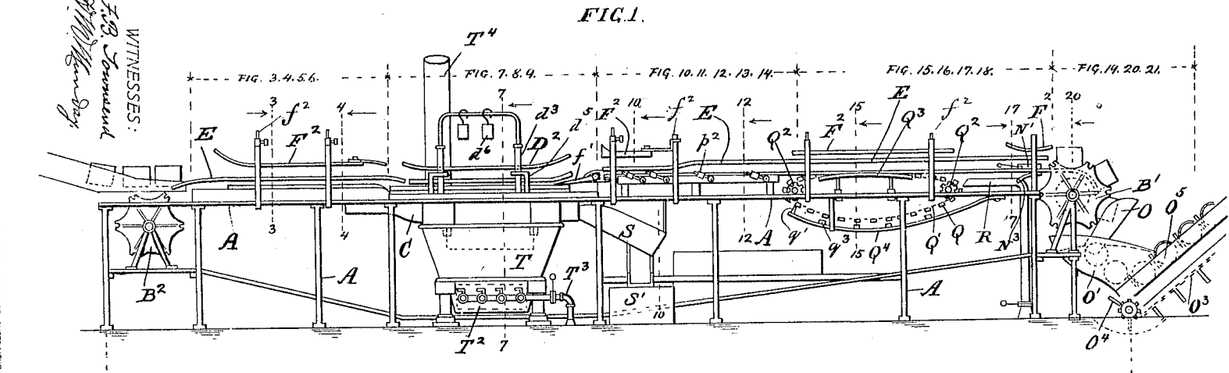
Figure 1 is a side elevation of a machine embodying the invention.
Figure 2:
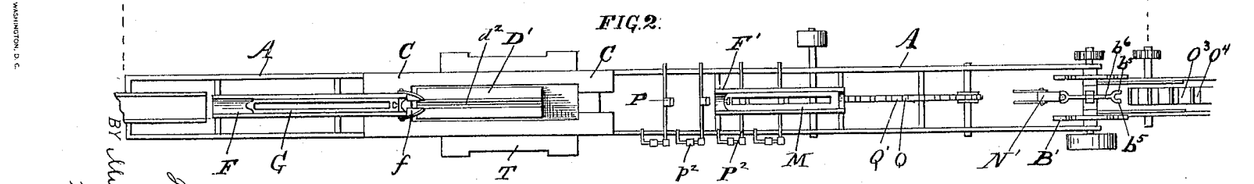
Fig. 2 is a plan view.
Figure 3:
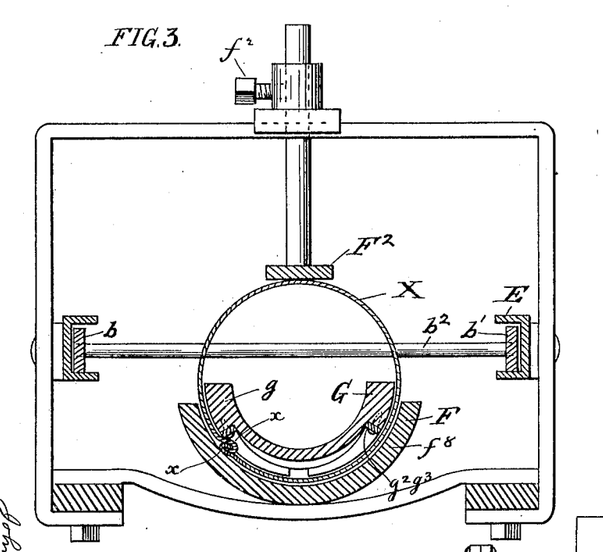
Figs. 3 and 4 are cross-sections on lines 3 3 and 4 4 of Fig. 1.
Figure 4:
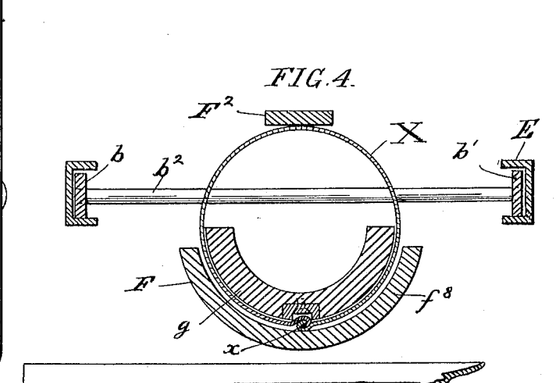
Figures 5, 6:
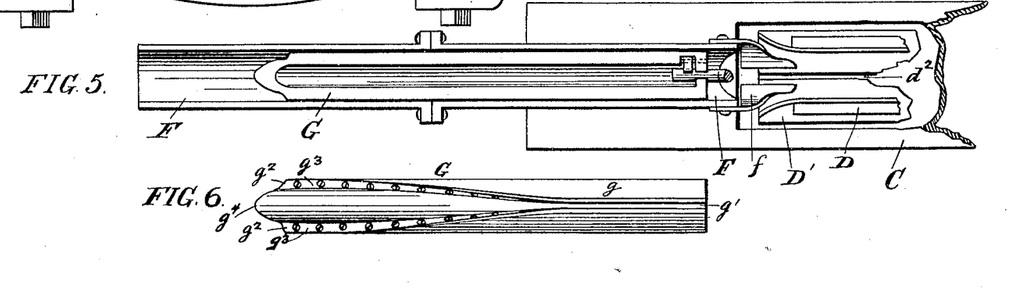
Figures 7, 8, 9:
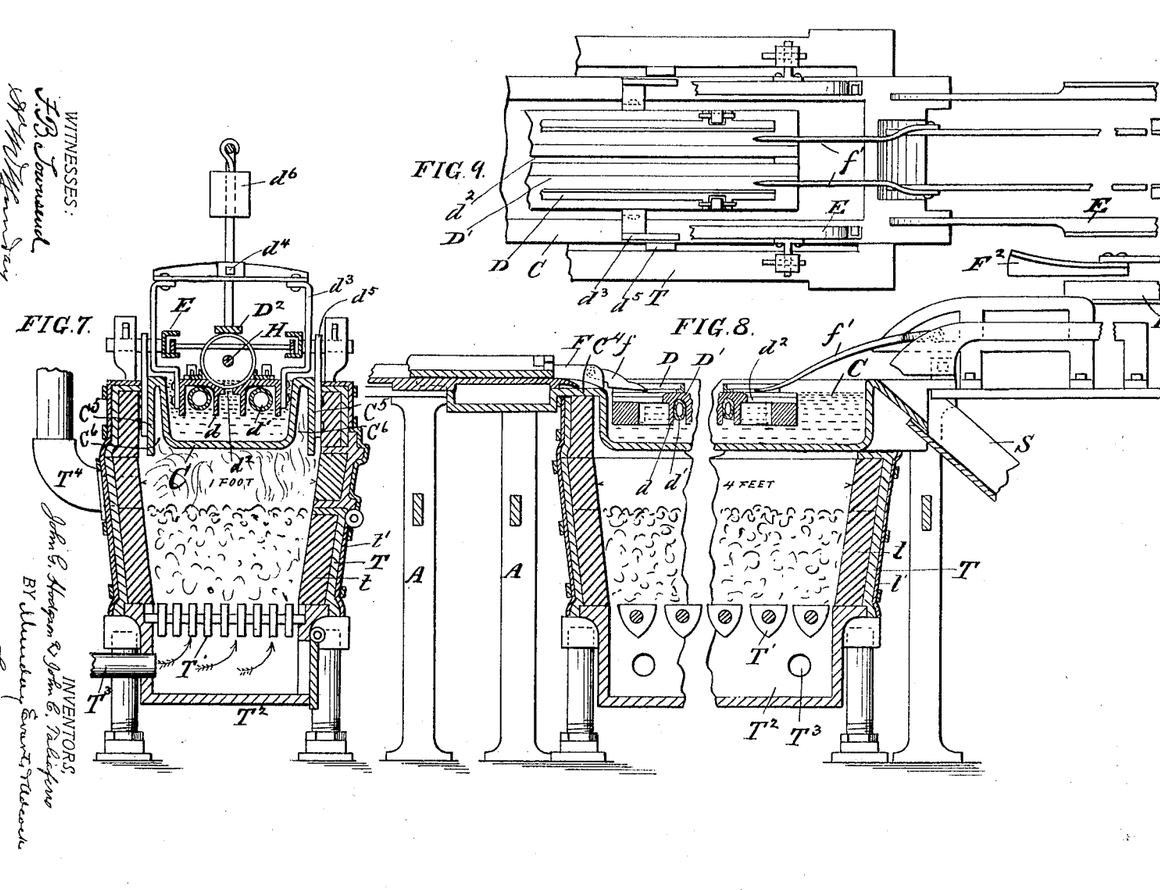
Figure 10:
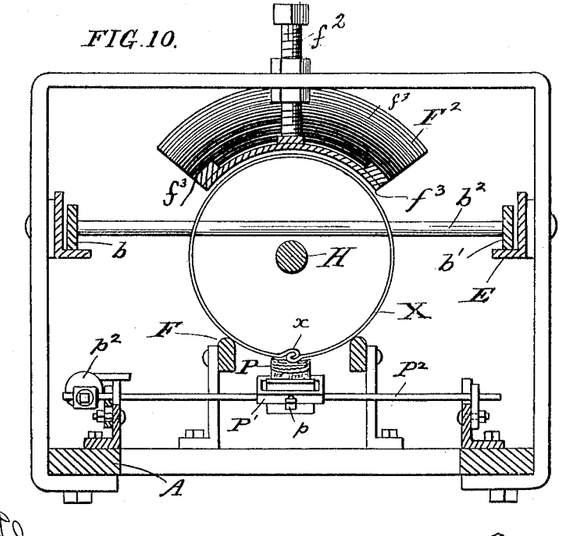
Figs. 10 and 12 are cross-sections on lines 10 10 and 12 12 of Fig. 1.
Figures 11, 13, 14:
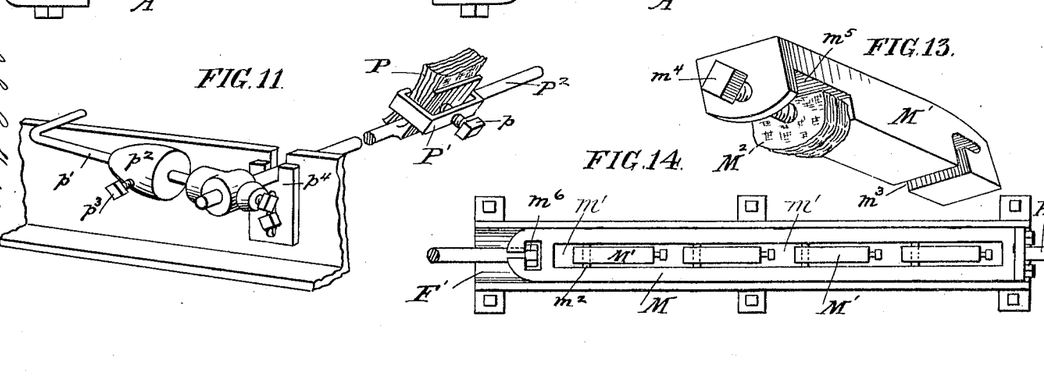
Fig. 11 is a detail perspective view of one of the outside wipers.
Fig. 13 is a detail perspective view of the inside wiper.
Fig. 14 is a detail plan view of the inside wiper-bar.
Figure 12:
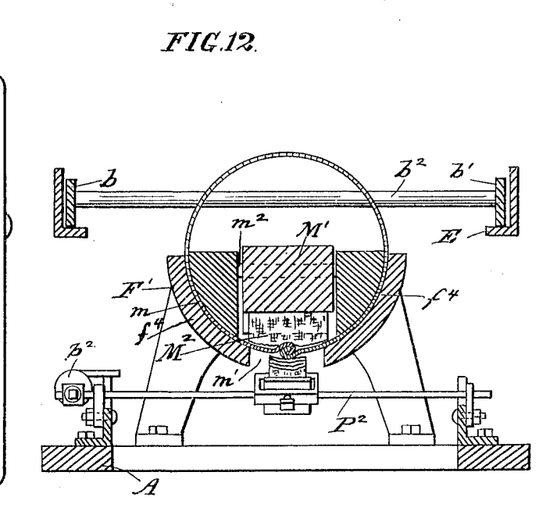
Figure 15:
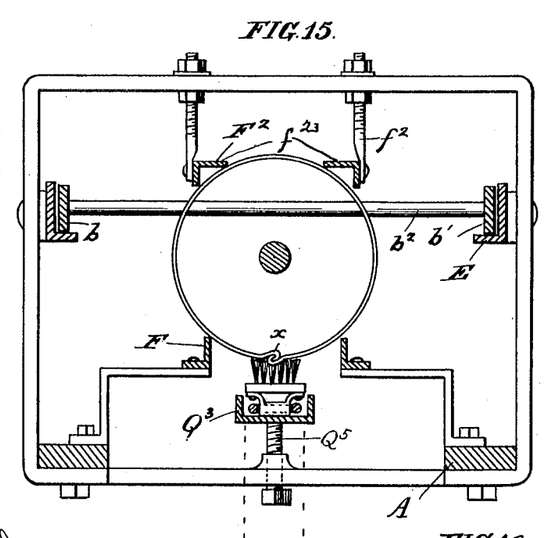
Figs. 15 and 17 are cross-sections on line 15 15 and 17 17 of Fig. 1.
Figure 16:
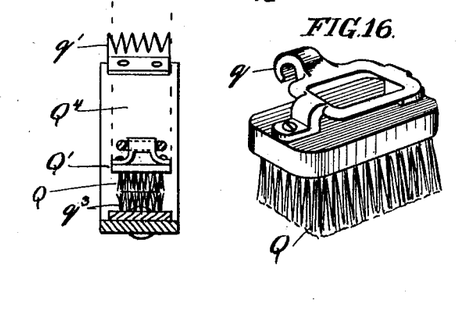
Fig. 16 is a detail perspective of the outside wiper or duster brushes.
Figure 17:
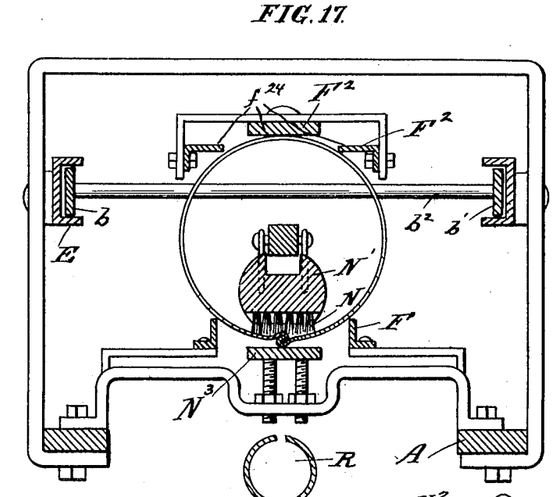
Figure 18:
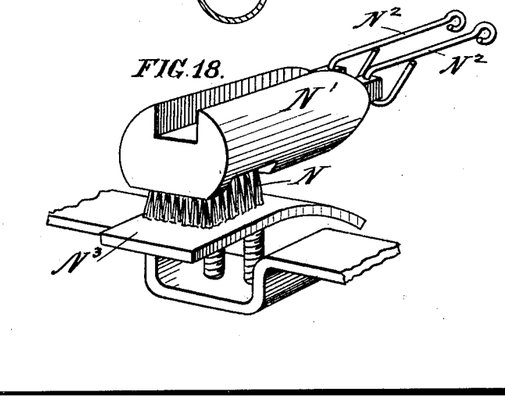
Fig. 18 is a detail perspective of the inside wiper or duster brush.
Figure 19:
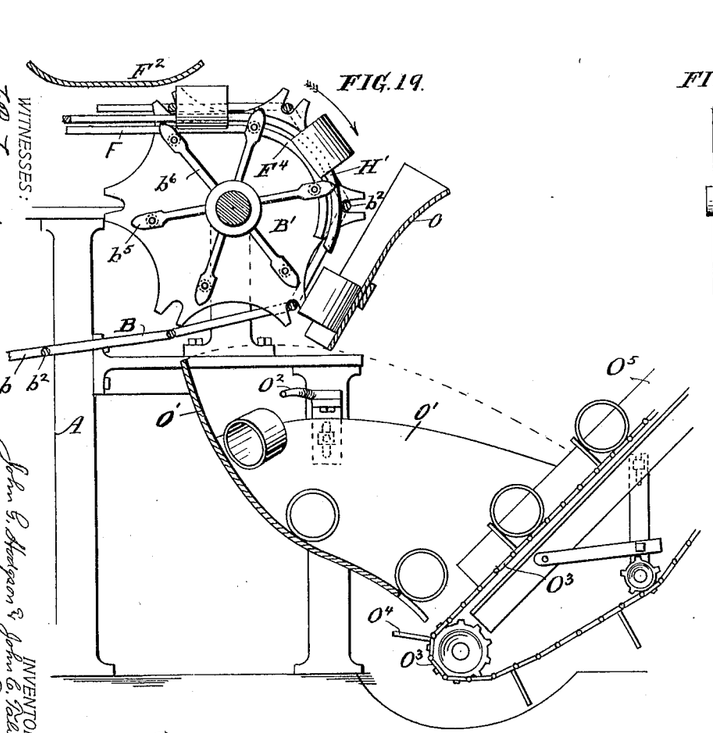
Fig. 19 is an enlarged elevation, partly in longitudinal section, showing the rear sprocket-wheel of the can-body carrier-chain and coöperating parts.
Figure 20:
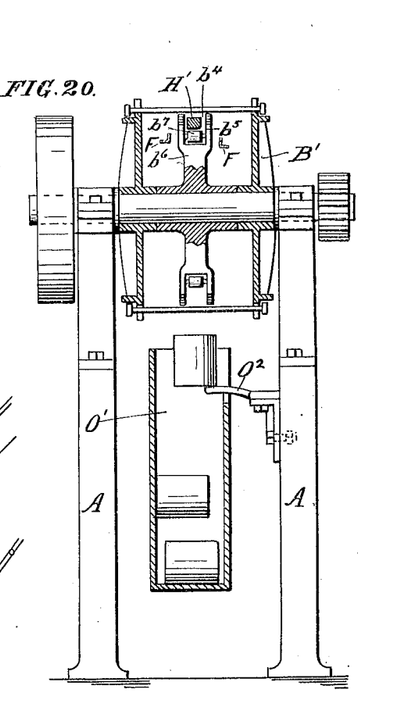
Figure 21:
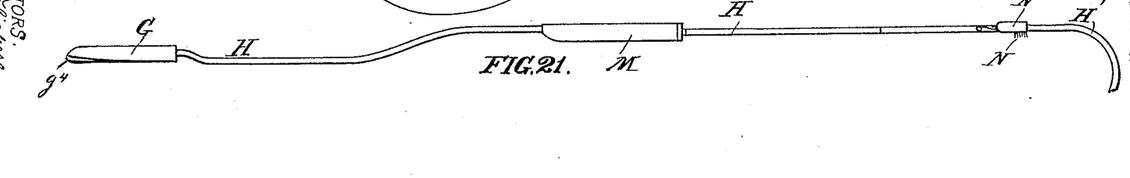

F is the track or guide for the can-bodies, leading to and from the solder-bath. For a portion of the way it may preferably consist of narrow track-rails, as indicated in Figs. 10, 15, and 17, and for a portion of the way may preferably be in the form of a curved shoe, as indicated in Figs. 3, 4, and 12, the curvature of the shoe corresponding to that of the can-body.

G is the can-body-seam turner, which engages the side seam of the can-body as it is moved forward by the carrier B and turns the can-body so as to bring its side seam centrally underneath, and thus cause it to properly register with the solder-bath. This seam-turner consists of a long heavy bar of metal having a curved lower face $g$ corresponding to the curvature of the can-body and provided with a longitudinal slot or groove $g'$ at its rear portion, which widens out into a fan or V shape at the front end of the turner, thus forming long curved or inclined shoulders $g^2\ g^2$, which engage the side seam of the can-body, and thus operate to turn the can-body. The shoulders $g^2\ g^2$ are preferably furnished with hardened-steel shoes or faces $g^3\ g^3$ to increase their durability and diminish the friction. The portion of the can-body guide or track F which coöperates with the seam-turner G is preferably of a curved shoe form $f^3$, as shown in Figs. 3 and 4, so as to properly support the flexible can-body against the weight of the seam-turner bar G, and thus insure certainty of proper engagement of the can-body side seam with the inclined shoulders of the seam-turner. The seam-turner has its front end $g^4$ beveled to insure proper entrance of the can-body between it and the curved shoe-track F. The seam-turner G is held in position longitudinally and also from turning radially on its own longitudinal axis by a long trunk-rod H, extending from the rear sprocket-wheel $B'$ over the solder-bath and the intermediate devices and around which the can-bodies pass and to which the rear end of the seam-turner G is attached and which itself is held in position longitudinally, as well as from radial or turning movement on its own longitudinal axis, by its curved end $H'$, which extends partially around the rear sprocket-wheel $B'$ and which fits in a channel $b^4$ thereon, formed by the flanges $b^5$ on said wheel, and the outer surface of which curved end $H'$ engages the cross-bars $b^2$ of the carrier-chain B as they pass around said sprocket-wheel $B'$. Longitudinal movement of the trunk-rod H is thus prevented by reason of its curved end contacting with the cross-bars $b^2$ of the can-body carrier or conveyer B. The flanges $b^5$ on the inner spokes $b^6$ of the sprocket-wheel are preferably furnished with antifriction-rollers $b^7$ to bear against the inner surface of the curved end H' of the trunk or rod H to diminish the friction. It will thus be seen that the curved end H' of the rod H is guided or supported on all of its four sides or faces, thus preventing the rod H from moving longitudinally or from turning axially. The shoe guide or track F at its end is furnished with light hinged members or extensions $f$, downwardly inclined, connecting with the float-guide or track D, and in like manner upper widely-inclined hinged members $f'$ connect the float-guide D with the portion of the guide or track F leading from the solder-bath to the rear sprocket-wheel B'. As only the free ends of the light pivotal track extensions $f f'$ can engage or rest upon the float-guide, they cause no variation in the height of the float in respect to the surface of the molten solder. $F^2$ is the upper guide for the can-bodies, mounted on the stationary frame of the machine. It may be adjusted up and down, as required, by set-screws $f^2$.

M is the inside wiper-bar, the same being connected at its ends to and held longitudinally in the path of the can-bodies by the trunk or rod H, with which it is connected and of which it may be considered as forming an intermediate section. The wiper-bar M is a heavy bar of cast-iron or other metal, having a curved lower face $m$, corresponding to the curvature of the can-bodies, and a central longitudinal channel or slot $m'$, furnished with cross-pins $m^2$, upon which the heavy metal wiper-holder blocks M' are pivotally hooked by the right-angle or hook-shaped slots $m^3$ therein. Each of the wiper-holders M' is furnished with a wiper $M^2$, preferably of asbestos, the same being removably clamped in a recess $m^5$ in the wiper-holder block by a clamp or screw $m^4$. This enables the wipers to be very quickly and conveniently removed and replaced without stopping the machine or interfering with its continued operation by simply unhooking and removing the wiper-blocks M' one at a time, putting in a new wiper $M^2$ therein, and replacing the wiper-block. As the machine is furnished with a series of these inside wipers, mounted in independent removable wiper-blocks, and as each wiper-block can be very quickly removed, examined, its wiper repaired, and the wiper-block replaced again in position, it will be readily understood by those skilled in the art that there is no necessity for stopping the machine in order to examine or renew the wipers. This is a great practical convenience, as well as economy. The front end of the inside wiper-block M has a vertically-slotted connection $m^6$ with the inside trunk or rod H, so that the parts may be readily coupled together.

N is the inside wiper or duster brush, which acts upon the inside of the seam after the soldered can-bodies have been conveyed past the inside wipers. The brush N is mounted upon and actuated by a brush-block N', which is pivotally connected by links $N^2 N^2$ with the inside trunk or rod H. A coöperating supporting-plate $N^3$, engaging the outside of the can-body, supports it against the pressure of this inside brush.

The outside wipers P, which remove the surplus solder from the outside surface of the seam, preferably consist, like the inside wipers, of asbestos pads, which are removably held in a wiper-holder P' by a clamp or screw $p$. Each of the wiper-holders P' has a rock-shaft $P^2$, to which it is connected and which is furnished with a weighted arm $p'$, by which the wiper is pressed with the required force against the can-body. The weight $p^2$ of this arm is adjustably secured thereto by a screw $p^3$, so that the pressure may be adjusted or varied as required. Each of the rock-shafts or bent levers $P^2$ of the outside wipers is removably mounted on the frame of the machine in a slotted bearing $p^4$ therefor, so that any one of the outside wipers may be conveniently removed and examined or renewed without stopping the machine or interfering with its operation. The inside and outside wipers M P are preferably located opposite, or so as to oppose each other in their pressure or action upon the can-body as it passes between them, as indicated in Fig. 12. As shown in Fig. 10, the pressure of the outside wiper, located at the point where this cross-section is taken, is opposed by the upper guide $F^2$ for the can-body, which here has a curved shoe or hood form $f^3$. As indicated in Fig. 12, the pressure of the outside wiper, located at the point where this cross-section is taken, is opposed in part by the inside wiper $M^2$ and in part by the curved face of the heavy inside wiper-bar M, and the can-body is supported against the pressure of the inside wiper and of the wiper-bar M by the lower guide F, which is here given a curved or shoe form $f^4$ in cross-section. The upper guide $F^2$ when coöperating with the endless chain of outside wiper or duster brushes Q Q is given a two-rail form $f^{23}$, as shown in Fig. 15, or a three-rail form $f^{24}$, as shown in Fig. 17, to better sustain the circular shape of the can-bodies against the pressure of the brushes.

Q Q are the outside wiper or duster brushes, which engage the outside of the seam and which are mounted upon an endless flexible traveling belt or chain Q', traveling on the sprocket wheels or pulleys $Q^2$. The brushes Q are each furnished with a hook $q$, by which they are removably connected to the belt or chain, and the flexible belt or chain of brushes is pressed against the can-bodies by a guide shoe or plate $Q^3$, over which they pass. The brushes are cleaned by brush-cleaner teeth $q'$ and cleaner-brushes $q^3$, attached to the lower guide-plate $Q^4$ and which the brushes engage in their return path. The guide or plate $Q^3$ for the wiper or duster brush belt Q' is supported on adjusting-screws $Q^5$ to enable it to be adjusted up and down as required.

The upper guide $F^2$ for the can-bodies terminates at the rear sprocket-wheel B'; but the lower guide F is provided with a curved extension F⁴, extending partially around the sprocket-wheel B', corresponding to the curved end H' of the inside trunk or rod H. The curved extension F⁴ and the curved end H' of the trunk H together guide and support the can-bodies while passing around the sprocket-wheel B' until they reach the discharge-point, where the same terminate. As the cans leave the curved extensions F⁴ and H' they are received by a stationary guideway or chute O, by which they are directed into the chute or passage-way O' and against a can-body-turning finger O², by which they are turned into a rolling position, so as to properly automatically enter the can-body conveyer O³, by which the can-bodies are delivered to the can-ending machine. The can-body conveyer O³ is preferably an endless chain or belt furnished with fingers O⁴ and travels in a guideway O⁵.

R is the seam-cooling device, the same preferably consisting in an air-blast pipe extending in part underneath and parallel to the path of the can-bodies and furnished with a slot on its upper side through which a blast of cold air is directed against the seams of the can-bodies as they pass. The cooler-pipe is connected with an air-pump, fan, or other source of compressed air.

T is the furnace for heating the solder-containing vessel C and melting and keeping molten the solder therein. The furnace T is a coal-burning one and is furnished with a grate T' and a closed box T² below the grate, into which enters an air-blast or air-feed pipe T³.

T⁴ is the flue or exhaust-pipe leading from the upper portion of the furnace.

The furnace consists of an iron frame or shell lined with fire-brick $t$ on the inside and with asbestos covering $t'$ on the outside. The solder bath or vessel C forms the top of the furnace and projects downwardly into the fire-box thereof, and is thus exposed directly to the radiant heat from the coals on the grate below. The solder bath or vessel C is also furnished with a horizontal flange C⁴, near its top at one end, which rests upon the top of the furnace end wall, and with downwardly-depending flanges C⁵ at its sides having a heating-space C⁶ between the same and the side walls of the solder vessel, so that the direct heat of the furnace fire-box may thus surround or embrace the sides of the solder vessel. The solder vessel thus forms the top of the fire-box of the furnace.

S is a solder-overflow chute or spout for directing overflow in case of accidental overflow of the molten solder from the vessel C into a vessel S'.

We claim—

1. In a side-seam-soldering machine for can-bodies, the combination with a solder bath or vessel, of a furnace for keeping the solder therein molten, a float in the solder bath or vessel, upper and lower guides on the float for the can-bodies, guides or tracks for the can-bodies leading to and from the float and connecting with the can-body guide on the float, a can-body carrier or conveyer chain having side bars and cross-bars with open spaces between to receive the can-bodies, sprocket-wheels for said carrier-chain, a track or guide for said carrier-chain, the rear sprocket-wheel having central spokes furnished with flanges at their outer ends forming a slot or channel between the same, an inside supporting trunk or rod H around which the can-bodies pass, furnished with a curved end H' fitting between the flanges on said central spokes of the rear sprocket-wheel, and engaging on its outer curved face the cross-bars of the carrier-chain, a can-body-turning device G connected at its rear end to said trunk or rod H and open at its front end to receive the can-bodies around it, and provided with a longitudinal channel or slot having diverging walls or shoulders to engage the side seam of the can-body, an inside wiper-bar connected to said trunk or rod, and provided with wiper-holder blocks and wipers, an inside wiper or dusting-brush connected to said trunk or rod, outside wipers, wiper-holders and weight-arm rock-shafts therefor, a series of outside wipers or duster-brushes, a traveling belt or chain upon which they are mounted, a plate or shoe for pressing said brushes against the can-bodies, brush-cleaner devices in the path of the brushes, can-body-receiving chutes or devices O and O', a can-body-turning finger or device O², and a can-body conveyer O³, substantially as specified.

2. In a side-seam-soldering machine, the combination with a solder-bath, of a float-guide for the can-bodies extending over the solder-bath, a fixed can-body track or guide connecting with said float-guide, and means for moving the can-bodies horizontally along said can-body guide and float-guide, substantially as specified.

3. The combination with a molten solder-bath, of a guide for the cans floating in the molten solder and thus automatically maintaining a fixed relation to the surface of the molten solder and a horizontally-moving can-body conveyer, substantially as specified.

4. The combination with a solder-bath of guide or track for the can-bodies, and a float in the solder-bath supporting said guide or track and a horizontally-moving can-body conveyer, substantially as specified.

5. The combination with a solder-bath, of upper and lower guides for the can-bodies and a float upon which both said guides are mounted or supported and means for moving the can-bodies along between said upper and lower guides, substantially as specified.

6. The combination with a solder-bath, of a float-guide, a fixed can-body track connecting therewith and a can-body conveyer for moving the can-bodies horizontally along, substantially as specified.

7. The combination with a solder-bath, of a float-guide, a horizontally-moving can-body conveyer, and means for supporting the conveyer independently of the float-guide, substantially as specified.

8. The combination with a furnace, of a solder bath or vessel forming the top of the furnace, a float having a central slot or channel for the solder to enter, a guide or track for the can-bodies on the float, a can-body conveyer or carrier, and a track or guide for the same, substantially as specified.

9. The combination with a furnace, of a solder bath or vessel forming the top of the furnace, a float having a central slot or channel for the solder to enter, a guide or track for the can-bodies on the float, a can-body conveyer or carrier, a track or guide for the same, and means for adjusting the height of the float in respect to the surface of the solder, substantially as specified.

10. The combination with a furnace, of a solder bath or vessel, a float therein, a can-body guide or track on the float, a can-body carrier, a track or guide therefor, sprocket-wheels for the carrier, and a can-body track or guide connecting with said track on the float, substantially as specified.

11. The combination with a furnace, of a solder bath or vessel, a float therein, a can-body guide or track on the float, a can-body carrier, a track or guide therefor, sprocket-wheels for the carrier, a can-body track or guide connecting with said track on the float, and a can-body-turning device in the path of the can-bodies and around which the can-bodies pass, substantially as specified.

12. The combination with a furnace, of a solder bath or vessel, a float therein, a can-body guide or track on the float, a can-body carrier, a track or guide therefor, sprocket-wheels for the carrier, a can-body track or guide connecting with said track on the float, a can-body-turning device in the path of the can-bodies and around which the can-bodies pass, and an inside trunk or supporting-rod extending from said can-body-turning device to the rear sprocket-wheel of the carrier, and provided with a curved end extending partially around said rear sprocket-wheel for holding the can-body-turning device in position, substantially as specified.

13. The combination with a furnace, of a solder bath or vessel, a float therein, a can-body guide or track on the float, a can-body carrier, a track or guide therefor, sprocket-wheels for the carrier, a can-body track or guide connecting with said track on the float, a can-body-turning device in the path of the can-bodies and around which the can-bodies pass, and an inside trunk or supporting-rod extending from said can-body-turning device to the rear sprocket-wheel of the carrier, and provided with a curved end extending partially around said rear sprocket-wheel for holding the can-body-turning device in position, said trunk or rod extending over and around the path of the cross-bars of the can-body carrier, substantially as specified.

14. The combination in a side-seam-soldering machine, with a can-body carrier or conveyer and its sprocket-wheels, of a can-body-turning device in the path of the can-bodies and around which they pass, of a trunk or rod for holding the same in position having a curved end extending partially around the rear sprocket-wheel, substantially as specified.

15. The combination in a side-seam-soldering machine, with a can-body carrier or conveyer and its sprocket-wheels, of a can-body-turning device in the path of the can-bodies and around which they pass, of a trunk or rod for holding the same in position having a curved end extending partially around the rear sprocket-wheel, and a track for the can-bodies, substantially as specified.

16. The combination in a side-seam-soldering machine, with a can-body carrier or conveyer and its sprocket-wheels, of a can-body-turning device in the path of the can-bodies and around which they pass, of a trunk or rod for holding the same in position having a curved end extending partially around the rear sprocket-wheel, and a track for the can-bodies having a curved end extending partially around said rear sprocket-wheel, substantially as specified.

17. The combination in a side-seam-soldering machine, with a can-body carrier or conveyer and its sprocket-wheels, of a can-body-turning device in the path of the can-bodies and around which they pass, of a trunk or rod for holding the same in position having a curved end extending partially around the rear sprocket-wheel, said can-body-turning device having a longitudinal slot or recess furnished with curved or inclined diverging shoulders to engage the side seam of the can-body, substantially as specified.

18. In a side-seam-soldering machine, a can-body-turning device connected at its rear end with a rod for holding it in position, and open at its front end for the can-bodies to pass onto and around it, substantially as specified.

19. In a side-seam-soldering machine, a can-body-turning device connected at its rear end with a rod for holding it in position, and open at its front end for the can-bodies to pass onto and around it and furnished with a longitudinal slot or recess having diverging curved or inclined shoulders, substantially as specified.

20. In a side-seam-soldering machine, a can-body-turning device connected at its rear end with a rod for holding it in position, and open at its front end for the can-bodies to pass onto and around it, and a track for the can-bodies, substantially as specified.

21. In a side-seam-soldering machine, a can-body-turning device connected at its rear end with a rod for holding it in position, and open at its front end for the can-bodies to pass onto and around it furnished with a longitudinal slot or recess having diverging curved or inclined shoulders, and a curved or shoe-shaped track for the can-bodies, substantially as specified.

22. In a side-seam-soldering machine, a can-body-turning device connected at its rear end with a rod for holding it in position, and open at its front end for the can-bodies to pass onto and around it and furnished with a longitudinal slot or recess having diverging curved or inclined shoulders, and a can-body carrier or conveyer engaging the can-bodies at their ends and leaving them free to turn, substantially as specified.

23. In a side-seam-soldering machine having an endless flexible can-body carrier mounted on sprocket-wheels, an inside supporting trunk or rod around which the can-bodies pass, furnished with a curved end extending partially around the rear sprocket-wheel, substantially as specified.

24. In a side-seam-soldering machine having an endless flexible can-body carrier mounted on sprocket-wheels, an inside supporting trunk or rod around which the can-bodies pass, furnished with a curved end extending partly around the rear sprocket-wheel, the cross-bars of the carrier engaging said curved end on its outside and holding the rod from forward longitudinal movement, substantially as specified.

25. In a side-seam-soldering machine having an endless flexible can-body carrier mounted on sprocket-wheels, an inside supporting trunk or rod around which the can-bodies pass, furnished with a curved end extending partly around the rear sprocket-wheel, the cross-bars of the carrier engaging said curved end on its outside and holding the rod from forward longitudinal movement, said rear sprocket-wheel having guides or flanges engaging said curved end and holding said rod laterally in position and from axial turning, substantially as specified.

26. In a side-seam-soldering machine having an endless flexible can-body carrier mounted on sprocket-wheels, an inside supporting trunk or rod around which the can-bodies pass, furnished with a curved end extending partly around the rear sprocket-wheel, the cross-bars of the carrier engaging said curved end on its outside and holding the rod from forward longitudinal movement, said rear sprocket-wheel having guides or flanges engaging said curved end and holding said rod laterally in position and from axial turning, and said sprocket-wheel being further provided with rollers or projections engaging the inner face of said curved end, substantially as specified.

27. In a side-seam-soldering machine, the combination with an inside wiper-bar free at its front end to admit the can-bodies around the same and furnished with an inside wiper, and connected at its rear end with a rod for holding it longitudinally in position and adapted to permit the can-bodies to pass off the same, substantially as specified.

28. In a side-seam-soldering machine, the combination with an inside wiper-bar furnished with an inside wiper, and connected at its rear end with a rod for holding it longitudinally in position, a can-body carrier, sprocket-wheels therefor, and said rod having a curved end extending partly around said sprocket-wheel, substantially as specified.

29. In a side-seam-soldering machine, the combination with an inside wiper-bar furnished with an inside wiper, and connected at its rear end with a rod for holding it longitudinally in position, a can-body carrier, sprocket-wheels therefor, said rod having a curved end extending partly around said sprocket-wheel, and an inside wiper or duster brush also connected to said rod, substantially as specified.

30. In a side-seam-soldering machine, the combination with a solder-bath, a track for the can-bodies, an endless flexible can-body carrier, sprocket-wheels therefor, an inside supporting trunk or rod extending from the rear sprocket-wheel over the solder-bath in the path of the can-bodies, a can-body turner open at its front end for entrance of the can-bodies around it, and connected at its rear end to said trunk or rod, substantially as specified.

31. In a side-seam-soldering machine, the combination with a solder-bath, a track for the can-bodies, an endless flexible can-body carrier, sprocket-wheels therefor, an inside supporting trunk or rod extending from the rear sprocket-wheel over the solder-bath in the path of the can-bodies, a can-body turner open at its front end for entrance of the can-bodies around it, and connected at its rear end to said trunk or rod, and an inside wiper supported from said trunk or rod, substantially as specified.

32. In a side-seam-soldering machine, the combination with a solder-bath, a track for the can-bodies, an endless flexible can-body carrier, sprocket-wheels therefor, an inside supporting trunk or rod extending from the rear sprocket-wheel over the solder-bath in the path of the can-bodies, a can-body turner open at its front end for entrance of the can-bodies around it, and connected at its rear end to said trunk or rod, and an inside wiper or duster brush also connected with said trunk or rod, substantially as specified.

33. In a side-seam-soldering machine, the combination with a solder-bath, a track for the can-bodies, an endless flexible can-body carrier, sprocket-wheels therefor, an inside supporting trunk or rod extending from the rear sprocket-wheel over the solder-bath in the path of the can-bodies, a can-body turner open at its front end for entrance of the can-bodies around it, and connected at its rear end to said trunk or rod, and an inside wiper-bar connected with said trunk or rod and furnished with a longitudinal slot or channel, and a series of wiper-holder blocks mounted in said slot or channel, substantially as specified.

34. The combination in a side-seam-soldering machine, with an inside wiper-bar, of a series of independently-removable wiper-holder blocks, substantially as specified.

35. The inside wiper-holder bar M, in combination with the removable wiper-holder block M' having hook $m^3$, substantially as specified.

36. The combination of wiper-holder bar M having a slot or recess $m'$ and transverse pins $m^2$, of wiper-holder block M' having hook $m^3$, substantially as specified.

37. The combination of wiper-holder bar M having a slot or recess $m'$ and transverse pins $m^2$, of wiper-holder block M' having hook $m^3$, wiper $M^2$ and wiper clamp or screw $m^4$, substantially as specified.

38. The combination with a solder-bath, track for the can-bodies and can-body carrier, of a series of outside traveling wiper or duster brushes mounted on an endless flexible belt or chain below the track for the can-bodies, and a guide shoe or plate over which said belt or chain passes and against which it bears for pressing the brushes against the can-bodies, substantially as specified.

39. The combination with a solder-bath, track for the can-bodies and can-carrier, of a series of outside traveling wiper or duster brushes mounted on an endless flexible belt or chain below the track for the can-bodies, a guide shoe or plate over which said belt or chain passes and against which it bears for pressing the brushes against the can-bodies, and means for adjusting said shoe or plate, substantially as specified.

40. The combination with a solder-bath, track for the can-bodies and can-body carrier, of a series of outside traveling wiper or duster brushes on an endless flexible belt or chain, and a guide shoe or plate over which said belt or chain passes for pressing the brushes against the can-bodies, and a cleaner for said brushes, substantially as specified.

41. In a side-seam-soldering machine, the combination with a solder-bath, a track for the can-bodies, a can-body carrier, sprocket-wheels therefor, said track for the can-bodies having a curved extension extending partly around the rear sprocket-wheel of the carrier, an inside rod H having a curved end H' around which the can-bodies pass, a can-body-receiving chute O, a can-body passage-way O', and a can-body-turning finger $O^2$, substantially as specified.

42. In a side-seam-soldering machine, the combination with a solder-bath, a track for the can-bodies, a can-body carrier, sprocket-wheels therefor, said track for the can-bodies having a curved extension extending partly around the rear sprocket-wheel of the carrier, an inside rod H having a curved end H' around which the can-bodies pass, a can-body-receiving chute O, a can-body passage-way O', a can-body-turning finger $O^2$, and a can-body conveyer $O^3$, substantially as specified.

43. The combination with the inside supporting trunk or rod H, of the inside wiper or duster brush N, its metal holder or block N', and pivoted links $N^2$ connecting it with said trunk or rod, substantially as specified.

Dated October 16, 1900.

JOHN G. HODGSON.
JOHN C. TALIAFERRO.

Witnesses:
H. M. MUNDAY,
EDMUND ADCOCK.